US006636246B1

(12) United States Patent
Gallo et al.

(10) Patent No.: US 6,636,246 B1
(45) Date of Patent: Oct. 21, 2003

(54) THREE DIMENSIONAL SPATIAL USER INTERFACE

(75) Inventors: Anthony Carmen Gallo, Toronto (CA); Colin E. Graham, Toronto (CA); Ron Dembo, Toronto (CA); Jimmy D. Talbot, Toronto (CA); Peter J. Gallagher, Toronto (CA)

(73) Assignee: Vizible.com Inc., Toronto (CA)

( * ) Notice: Subject to any disclaimer, the term of this patent is extended or adjusted under 35 U.S.C. 154(b) by 0 days.

(21) Appl. No.: 09/527,917

(22) Filed: Mar. 17, 2000

(51) Int. Cl.[7] .................................................. G06F 3/00
(52) U.S. Cl. ........................ 345/805; 345/850; 345/746
(58) Field of Search ................................ 345/805, 782, 345/742, 743, 748–749, 803–804, 848–855, 653, 836, 441, 676–680, 744–747, 757, 778–779

(56) References Cited

U.S. PATENT DOCUMENTS

| 5,148,154 A | | 9/1992 | MacKay et al. | |
|---|---|---|---|---|
| 5,303,388 A | | 4/1994 | Kreitman et al. | |
| 5,339,390 A | | 8/1994 | Robertson et al. | |
| 5,485,197 A | | 1/1996 | Hoarty | |
| 5,515,486 A | | 5/1996 | Amro et al. | |
| 5,602,564 A | * | 2/1997 | Iwamura et al. | 345/119 |
| 5,678,015 A | | 10/1997 | Goh | |
| 5,729,673 A | * | 3/1998 | Cooper et al. | 345/782 |
| 5,838,326 A | | 11/1998 | Card et al. | |
| 5,880,733 A | | 3/1999 | Horvitz et al. | |
| 5,883,625 A | * | 3/1999 | Crawford et al. | 345/744 |
| 6,005,579 A | | 12/1999 | Sugiyama et al. | |
| 6,016,145 A | * | 1/2000 | Horvitz et al. | 345/850 |
| 6,104,391 A | * | 8/2000 | Johnston, Jr. et al. | 345/744 |
| 6,262,736 B1 | * | 7/2001 | Nelson | 345/853 |
| 6,307,574 B1 | * | 10/2001 | Ashe et al. | 345/765 |
| 6,344,861 B1 | * | 2/2002 | Naughton et al. | 345/769 |
| 6,363,404 B1 | * | 3/2002 | Dalal et al. | 707/513 |

FOREIGN PATENT DOCUMENTS

| EP | 0 483 777 A2 | 6/1992 |
|---|---|---|
| EP | 0 767 418 A | 4/1997 |

OTHER PUBLICATIONS

Levy, Steven, "Screen Wars", Dec. 11, 2000, Newsweek, p. 67–69.
McCracken, Harry, "CubicEye Invites You to Browse the Web in 3D", Apr. 5, 2001, PCWORLD.COM.
Santos, Roy, Give your Web–surfing experience new depth with the CubicEye 3D Browser, Apr. 16, 2001, TECHTV.
http:/ /www.2ce.com/cubiceye.php, "CubicEye", 2ce, Inc.
http:/ /www.2ce.com /information.html, "Information", 2ce, Inc.
"Virtual Reality Menu Systems", IBM Technical Disclosure Bulletin, IBM Corp. New York, U.S., vol. 36, No. 12, Dec. 1, 1993, p. 227–228.

* cited by examiner

*Primary Examiner*—Steven Sax
(74) *Attorney, Agent, or Firm*—Bereskin & Parr

(57) ABSTRACT

A method and system of providing a three dimensional spatial user interface (SUI) to a user of a computing device. The SUI may be manipulated in three dimensions and contains a plurality of portals. A portal may contain a sensory cue that provides a reminder as to the content of the portal. Upon selection of a portal, an application program associated with the cue in the portal is invoked. Portals may also contain further instances of the SUI of the present invention, thus providing hierarchical depth. In the preferred embodiment, the SUI is implemented as a sphere and may be viewed from an external or internal perspective.

23 Claims, 11 Drawing Sheets

THREE DIMENSIONAL SPATIAL USER INTERFACE

FIELD OF THE INVENTION

The invention relates to a user interface to a computing device. In particular the invention relates to a user interface that is displayed in three dimensions to display a plurality of sensory cues.

BACKGROUND OF THE INVENTION

As late as the early 1990's, a user interacted with most computers through text-based interfaces, such as Microsoft's MS-DOS™ operating system or any of the many variations of UNIX. Text based interfaces in order to provide complete functionality often contained cryptic commands and options that were far from intuitive to the non-experienced user. In addition, opening several applications simultaneously was often not possible, not only due to poor memory management by the underlying operating system, but also because each application generally monopolized the entire screen, making the navigation from application to application difficult.

Most current computer systems use two-dimensional graphical user interfaces to allow the user to manipulate the information stored on the system. These graphical user interfaces (GUIs) usually create graphical entities called "windows" to view individual documents. These windows can be placed around the screen and sized according to the user's preferences. They also enable the user to scroll through a document when the document is too large to be seen all at once. The main advantage of these GUIs over previous generation interfaces (as described above) was that one may have several documents opened within an application, and several applications running at once. In addition, it became possible to associate an application with an icon, thus providing visual recognition. The user no longer had to remember arcane keywords and commands. The user could manipulate graphical abstractions of files and tools within windows on a screen. This new paradigm along with the introduction of the mouse, revolutionized how people used computers.

However, the complexity of the tasks performed by even casual computer users, as well as the number and types of tasks, is continually rising. It is not unusual for a user to be simultaneously running applications that allow them to: connect to the Internet, edit a document (text or multimedia), read electronic mail, access a calendar, receive or send a FAX, utilize a spreadsheet, etc. A complex task often requires the use of multiple applications to complete a task; it also requires that within an application, multiple documents may need to be accessed simultaneously. Thus, the modern user often has a large number of windows opened on the screen at once. The existing paradigm has trouble supporting a large number of windows opened simultaneously. It becomes difficult for the user to navigate through a stack of windows piled up on top of each other. Attempts have been made to alleviate the problem by providing navigational aids.

One such tool is the "taskbar". The taskbar is used to navigate between applications. The taskbar displays the name of each open window on separate buttons, sometimes accompanied by an icon representing the application that controls the window. The icons help in finding the right application. However, if there are multiple instances of the same application running, they will each have the same icon. Furthermore, the task bar quickly fills up, at which point the names become illegible.

Another navigational aid currently in use is the "window list" (typically used to navigate through the windows within a single application). This list shows the names of all the windows opened within an application; the user can bring a window to the top of the stack by clicking on its name. This is inconvenient as the user has to read all the names, and the length of the list that can be displayed is also limited. When the list is too long, the window list requires the user to select "More windows . . . " if a window that is not on the list needs to be activated. By selecting "More windows . . . ", another window list is displayed.

It is clear that the use of a taskbar and a window list improve the current two dimensional interface, but with limited success. More recently, attempts have been made to utilize a three dimensional graphical user interface. Most people are comfortable interacting with three dimensional views on a computer screen. For example, modern computer games have a 3D interface to provide the illusion that the player is part of the environment. Examples of 3D interfaces are discussed below.

U.S. Pat. No. 5,148,154 discloses a GUI that permits the production and creation of multi-media presentations. The GUI is implemented as a three dimensional "venue" (best shown in FIG. 4). Viewing of the venue through different walls, provides different views of the resources available (e.g. sound or video). For example, a top view may represent the resources in time, such as the time required for a sound or video track in a movie. Thus each view represents a different attribute view of the resources available. There is no single view that allows the user to comprehend all the information contained within the interface.

U.S. Pat. No. 5,303,388 discloses a three dimensional icon associated with an object in the computer system. The example best shown in FIG. 7 is that of a data or program file where the attributes of that file are indicated on faces of the icon. The attributes including: size, date created, date last modified and type of content. The disadvantage of this approach is that each object within the system must have its own three dimensional icon. A user would thus be faced with hundreds of icons, with no conceptual framework in which to place them.

U.S. Pat. No. 5,339,390 discloses a central window with two peripheral extensions, one extension on each side of the central window. The extensions serve as additional windows with content displayed to the user. The user may contract the central window to better view objects on the extensions. Similarly, the central window may be stretched to better view the objects on the central window. This stretching is dependant upon which portion of the three windows the user wishes to view. As a point or object is selected for viewing the windows are appropriately modified in size to centre the object in the central window. This is best shown in FIG. 6. This patent discloses a variation on the common solution to the problem of too much data appearing in a window. The solution is simply to make the window larger than that which can be displayed on a single screen. As with other such solutions, this does not scale very well as a large amount of data requires scrolling across many panels.

U.S. Pat. No. 5,485,197 discloses an interactive television system having means for displaying a "carousel" to allow the user to make a menu selection. As disclosed, the carousel displays a plurality of menu items on each face of the carousel. The items are displayed in text only and adjacent sides of the carousel are only marginally visible. The carousel rotates only about a single central vertical axis, hence the name "carousel". The carousel concept is wasteful of space, for example no data is available on the top or bottom of the carousel. Further, the carousel may be only rotated around one axis, requiring repeated user interaction to rotate the carousel to reveal the rear face. Finally, each menu provides at best a minimal visual cue as to the content accessible by each menu selection.

U.S. Pat. No. 5,515,486 discloses a GUI in the form of a polyhedron display container. Each face of the polyhedron contains icons associated with an application and "workspace switches" which allow the user to switch between active applications. A central front panel is the active panel and the user may select a new face of the polyhedron to be the active panel. In doing so, the polyhedron rotates a band of faces about a vertical, horizontal or diagonal axis to provide a new central active panel. As can be seen in FIGS. 3 or 4, the faces of the polyhedron are trapezoids, which are mapped to a rectangle when they become the central active panel. Due to the nature of the rotational interface, the inventors have in essence disclosed a three dimensional structure with a two dimensional user interface. The invention does not consider the rotation of the polyhedron as a whole about an axis of choice. In other words, a user may only rotate faces along specific axes.

U.S. Pat. No. 5,678,015 discloses a "four-dimensional" GUI. The GUI consists of a cube, having a window containing icons displayed on each of the six faces. The fourth dimensional aspect is the ability to rotate the cube in real time. The object of the invention being to allow the user to see far more windows simultaneously than would be available with a tiled screen or more conventional interface. Practically, the invention is flawed, as in order to view multiple faces, the walls must be transparent, thus creating a very confusing view for the user. In addition, unless a face is viewed obliquely, i.e. having an edge in the centre of the screen (see FIG. 5), the image will be nearly illegible given the clutter of multiple icons and the necessity to always provide a three dimensional view of a cube.

U.S. Pat. No. 5,838,326 discloses a three dimensional workspace for interacting with large numbers of documents. Three types of spaces are described: a focus space for the current document, an immediate space for placing documents close at hand, and a tertiary space where documents are stored. The immediate space is represented by placing documents on a desk or hanging them in the air. The tertiary space is shown as a bookshelf. This invention is an example of an attempt to organize data in a format that may be friendly to a specific type of user, in this case one who deals with large numbers of documents. It does not lend itself well to the storage of objects other than documents and it is not intuitive as to where documents may be stored.

U.S. Pat. No. 6,005,579 discloses a GUI that appears as a rectangular parallelepiped (i.e. a room). The user can simultaneously view and select items from a left wall, a central wall, a right wall and the floor or ceiling. This invention provides an interface where the user views his surroundings as if he were in a room. It has the disadvantage that only five surfaces are presented, and there is no capability provided to view a rear wall.

U.S. Pat. No. 6,016,145 discloses a GUI that displays multiple windows within a plurality of planes. The planes in the preferred embodiment represent the walls, floor and ceiling of a room. Windows may be moved between planes and are resized and reshaped accordingly. For example, a window on the back wall will appear smaller than a window on the front wall. Windows are tiled or stacked over other windows that may occupy the same plane. Thus the windows are "hung" upon a plane that is a wall of the room. The inventors also provide for a plurality of "isometric spaces" (FIG. 13) arranged about a "bonding surface", in this case a central hub. Each isometric space is selectable by the user and each space contains a plurality of windows. This invention again makes use of the user interface as a "room" and permits the tiling of windows on each surface. Multiple rooms are considered, but there is no logical association between the rooms.

European patent publication number 483,777A3 (claiming priority from U.S. application 606,227 dated Oct. 31, 1990) discloses imaging techniques to display an icon in a three dimensional manner. This is achieved by highlighting features and edges of the icon with shading and different colours. This invention has slightly enhanced the concept of layered two dimensional windows by providing each window with three dimensional attributes to aid in recognition of the window. However, the windows are still layered, in that they overlay each other. The concept of a scaled down version of the contents of a window is also suggested to allow the user to sort and classify items on a visual basis. The traditional concepts of utilizing a three dimensional illustration of a filing cabinet or other storage device such as bookshelves or slide trays is also disclosed. Finally, the concept of having the image of a program icon change as the status of the application associated with the icon changes, is also discussed. This invention merely highlights the attributes of an icon or window to make them appear three dimensional and provide a sense of depth, it is a slight enhancement over the standard two dimensional interface.

As discussed above, there have been many attempts to apply a three dimensional or spatial aspect to the traditional two dimensional GUI. There have also been attempts to create a three dimensional GUI. However, none of these inventions have provided a practical and visually intuitive interface to allow users to efficiently and intuitively access the resources of a computing device via a three dimensional user interface. There is a need for a three dimensional user interface that is more intuitive and more easily utilized than the solutions provided to date.

SUMMARY OF THE INVENTION

The present invention provides a three dimensional interface that allows a user to intuitively locate and access resources from a computing device. The invention allows a user to interact with the interface in a three dimensional space. Accordingly, the user interface is referred to herein as a Spatial User Interface (SUI).

In accordance with one aspect of the present invention there is provided a user interface for a computing device, said interface comprising a graphic representation of a plurality of portals arranged in a three dimensional space; and a sensory cue displayed in at least one of said portals to facilitate recognition by a user of an application associated with said sensory cue.

In accordance with another aspect of the present invention there is provided a method for creating a populated three dimensional user interface, said method comprising the steps of: a) graphically representing a plurality of portals in a three dimensional space; b) mapping sensory cues on a one to one basis to at least some of said portals; and c) associating an application with each of said sensory cues.

In accordance with another aspect of the present invention there is provided a computer device for displaying a three dimensional user interface, said device comprising means for displaying said interface, said interface comprising: a graphic representation of a plurality of portals arranged in a three dimensional space; and a sensory cue displayed in at least one of said portals to facilitate recognition by a user of an application associated with said sensory cue.

In accordance with another aspect of the present invention there is provided a method for populating portals in a three dimensional user interface, said user interface having an exterior and an interior, comprising the steps of:

a) establishing a connection with a first web page;

b) creating a sensory cue based on the first web page;

c) mapping said sensory cue to an exterior portal; and d) creating sensory cues for each additional web page accessible from said first web page and mapping said sensory cues to portals located on the interior of said user interface.

In accordance with another aspect of the present invention there is provided a computer readable medium containing instructions for controlling one or more three dimensional user interfaces in a computing device, by:

a) permitting a user to select a user interface, said selected interface containing a plurality of portals;

b) monitoring for first user input, said input indicating a portal of interest to said user;

c) upon receiving said first user input, moving said selected interface to centrally display said portal of interest;

d) monitoring for second user input to make said portal of interest an active portal, if input other than said second user input is received, returning to step b);

e) upon receiving said second user input, invoking an application program, until said user provides third user input to move to another portal; and f) repeating steps b) to e) until said user provides third user input, thereby returning to step a)

BRIEF DESCRIPTION OF THE DRAWINGS

The present invention will now be described, by way of example only, with reference to the following drawings, in which like reference numerals refer to like parts, and in which.

DETAILED DESCRIPTION OF THE INVENTION

The present invention provides a novel means to organize and present information using three-dimensional graphics (3D graphics) to create a spatial user interface (SUI). 3D graphics involve mathematical representation of 3D objects, and the projection of the 3D representation for viewing by a user. This present invention is general enough that it can entirely replace current windows based environments.

The SUI of the present invention makes no assumption about the underlying operating system. As a 2D window environment can be used to hide the underlying specifics of a platform, so can the 3D. SUI of the present invention.

Figure 1:
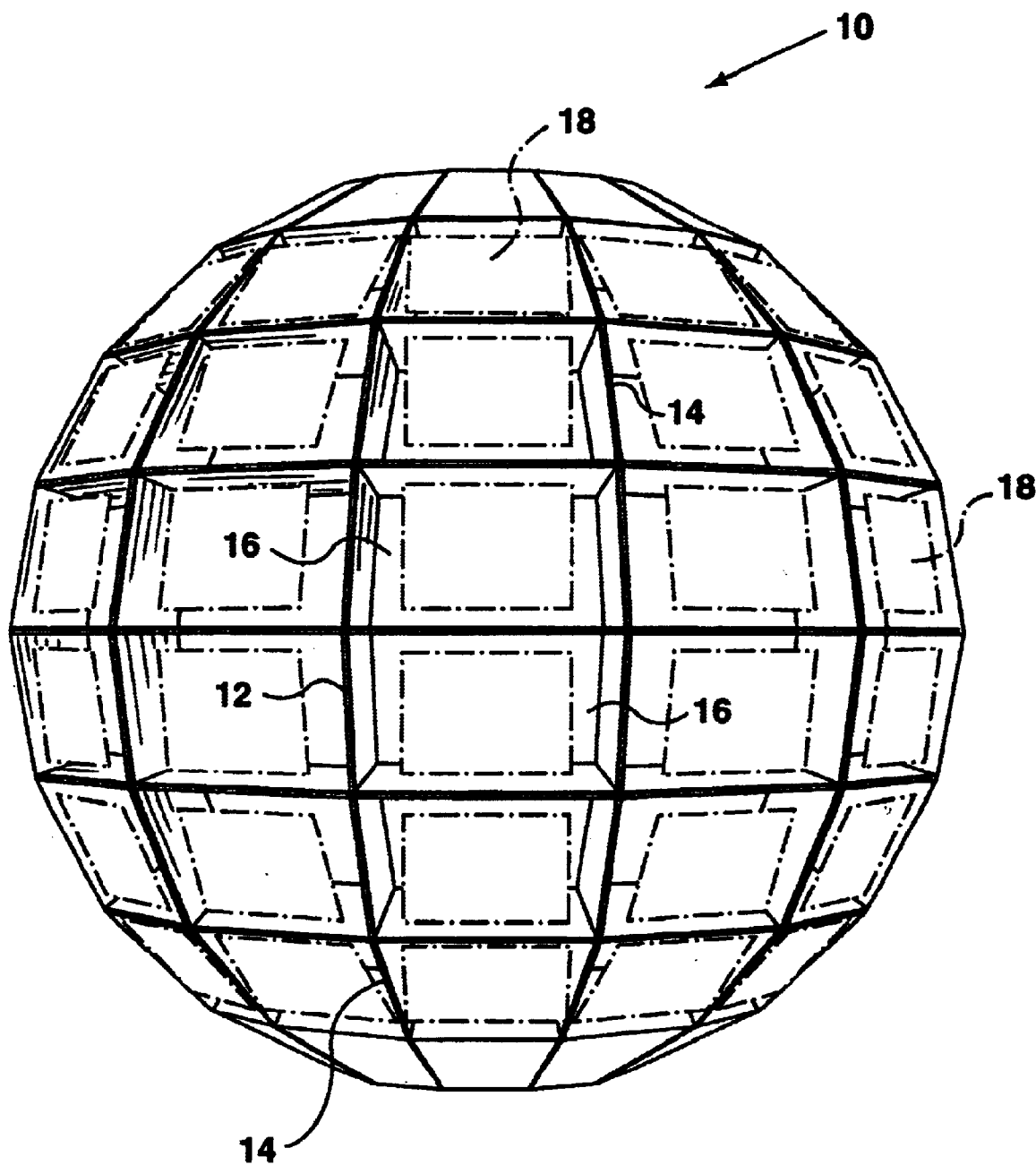
FIG. 1 is an elevational view of the SUI of the present invention.

Referring first to FIG. 1, an elevational view of the SUI of the present invention, the SUI is shown generally as 10. SUI 10 preferably includes an armature 12 having a plurality of ribs 14. Ribs. 14 define a plurality of portals 16. Portals 16 may be empty or may contain sensory cues 18. Sensory cues 18 serve to provide a cue as to the content contained within the portal 16 in which they are located. Most preferably the sensory cue 18 is a visual cue, however, cues associated with other senses are contemplated when advancements in technology will permit such cues to be utilized (e.g. smell, sound, touch or even taste).

Sensory cues 18 are associated with an application. Sensory cues 18 may correspond to any type of content such as static or dynamic documents, three dimensional holograms or another SUI. For example, a sensory cue 18 displaying an image of a movie may be associated with an MPEG movie player to play the movie. A sensory cue 18 showing a page of a spread sheet will be associated with a spreadsheet application and a sensory cue 18 showing a web page would have web browser associated with it. One form of sensory cue 18 is a snapshot of a window used by the associated application (e.g. a web page, or a page of a text document), when the application was last active. A snapshot is a way to automatically generate a relevant icon for a sensory cue 18, as it simply takes a picture or snapshot of a screen to be used as a visual cue.

The process of creating the snapshot involves accessing the underlying graphics resource of a window and making a copy of the individual pixels. When the snapshot and the original window are aligned properly, the snapshot becomes indistinguishable from the real window, except that the snapshot doesn't support user interaction. Displaying the snapshot is very efficient; it can be applied as a texture in the form of a sensory cue 18 on a portal 16. This is much quicker than having the application associated with sensory cue 18 display sensory cue 18 each time the display needs to be refreshed. It is this snapshot concept that allows the SUI 10 to handle a large number of sensory cues 18 at once. If snapshots are not used, each application associated with a sensory cue 18 would have to keep recreating the information in a sensory cue 18 as the portal 16 in which it is displayed comes within the view of the user.

The concept of providing portals 16 containing unique sensory cues 18 is radically different from the concept of "icons" used today. With icons, users are shown a visual mnemonic of the application that is associated with the sensory cue 18. Users still have to read the document name when shown a list of document icons created with the same application. Sensory cues 18 let people exploit their natural ability to easily memorize the appearance of a portal 16 without having to remember any other details (such as the text of a document, or even the filename of the document). Together with the spatial organization of sensory cues 18 in SUI 10 as discussed further below, portals 16 populated with unique sensory cues 18 let a user remember the arrangement of content more easily than current interfaces. Portals 16 do not have to contain 2D windows. When doing 3D modelling, for example, a portal 16 could contain a snapshot of the 3D object being modeled.

The optimal shape for displaying multiple portals 16 is on the surface of a sphere. In addition to providing the user with a maximal number of visible portals 16, a sphere lends itself particularly well to rotation upon any axis. The inventors recognize that an armature 12 for aiding in the visual definition of portals 16 may be formed in any shape. Thus ribs 14 may be substituted with any structure capable of forming an armature 12, such as the frame for a geodesic dome, cylinder, cube, combination of known shapes or an irregular shape such as a building. The inventors do not intend to exclude shapes other than a sphere from the ambit of the present invention. The armature 12 is used to provide clues to the user as to the 3D structure of the SUI 10 as well as providing a visual aid by framing sensory cues 18. There is no requirement that the present invention have an armature 12, for example, sensory cues 18 may simply be displayed about the surface of the SUI 10 with no additional "supporting" structure.

Returning now to the shape of the SUI 10, a sphere allows the user to rotate the sphere about any axis to quickly glance over the sensory cues 18 contained in portals 16. The geometry used for a SUI 10, may suggest different manipulation clues to the user. For example, using a cylinder geometry would suggest that the SUI 10 could only be rotated about the central longitudinal axis of the cylinder. Similarly, portals 16 may take any geometric shape, however, in the preferred embodiment they are rectangular to best display a typical rectangular window. Also a user may adjust the geometry of SUI 10 by stretching or distending SUI 10, or individual portals 16.

Figure 2:
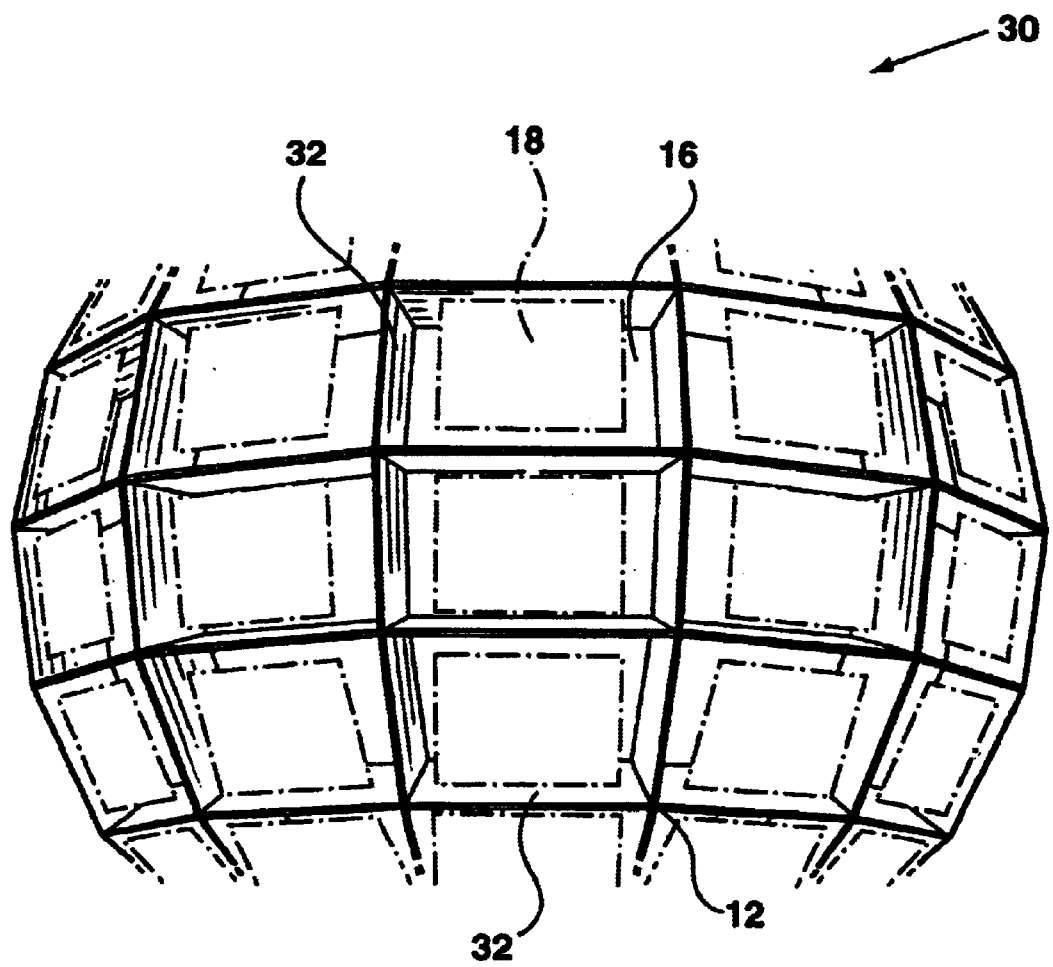
FIG. 2 is an elevational view of a portion of the SUI of the present invention.

Referring now to FIG. 2, an elevational view of a portion of SUI 10, the portion is shown generally as 30. The armature 12 geometry surrounding a portal 16 is a portal frame 32. A portal frame 32 can be used to support additional functionality such as buttons. As shown in FIG. 2 the portal frames 32 for each portal 16 display no functionality characteristics and are in fact transparent behind the sensory cue 18 allowing the user to view into the SUI 10.

Figure 3:
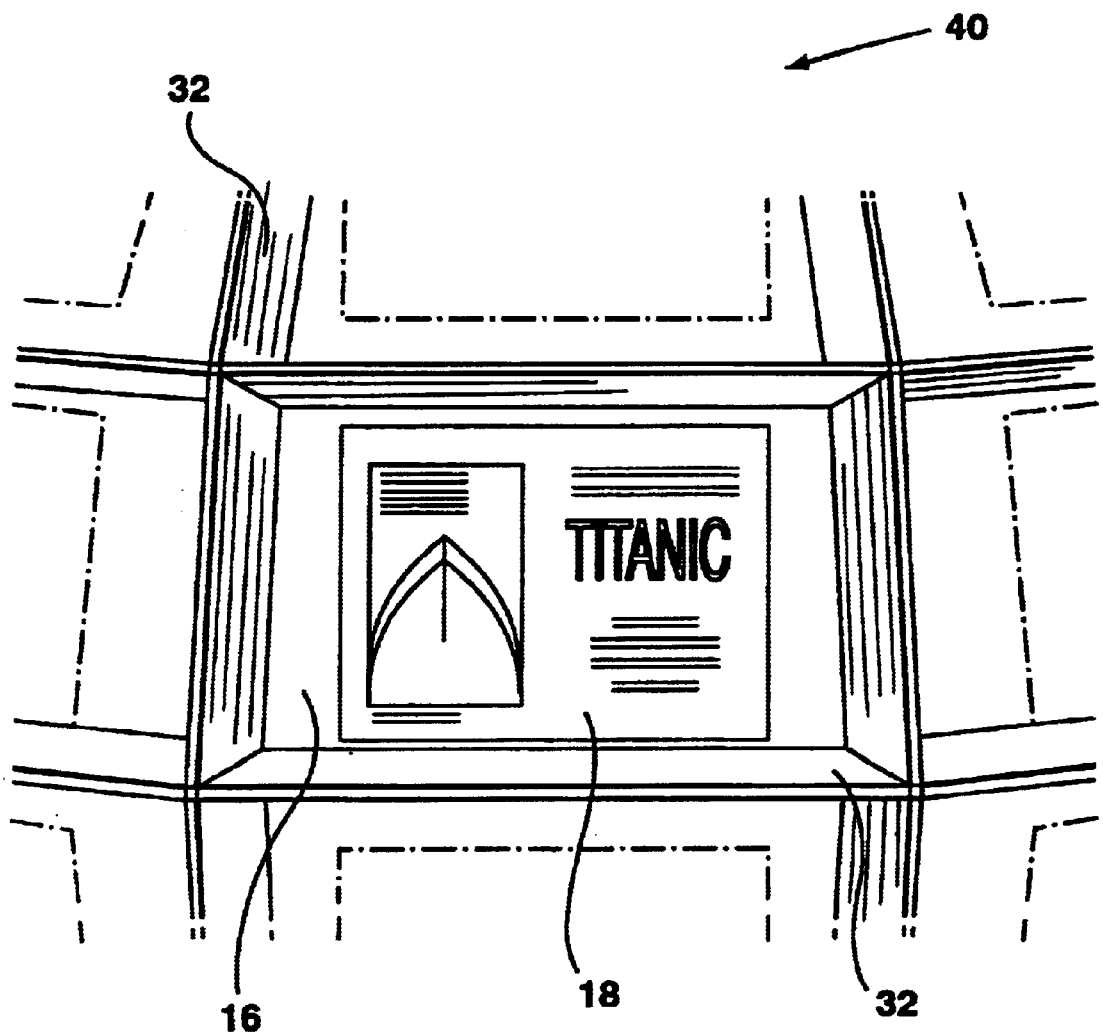
FIG. 3 is an elevational view of an active portal.

Referring now to FIG. 3, an elevational view of an active portal is shown generally as 40. Portal 16 is active, i.e. it has been selected by the user. When a portal 16 becomes active SUI 10 is rotated to have the now active portal 16 face the user. The sensory cue 18 within the portal 16 is enlarged for better viewing and the portal frame 32 is altered to highlight the portal. In this example the perspective views of the ribs 14 of the armature 12 form the portal frame 32 and frame the sensory cue 18. The colour of the portal frame 32 is also changed as a visual cue indicating that the portal 16 is active. An active portal may contain a conventional 2D window with the accompanying scrollbars and taskbars.

Figure 4:
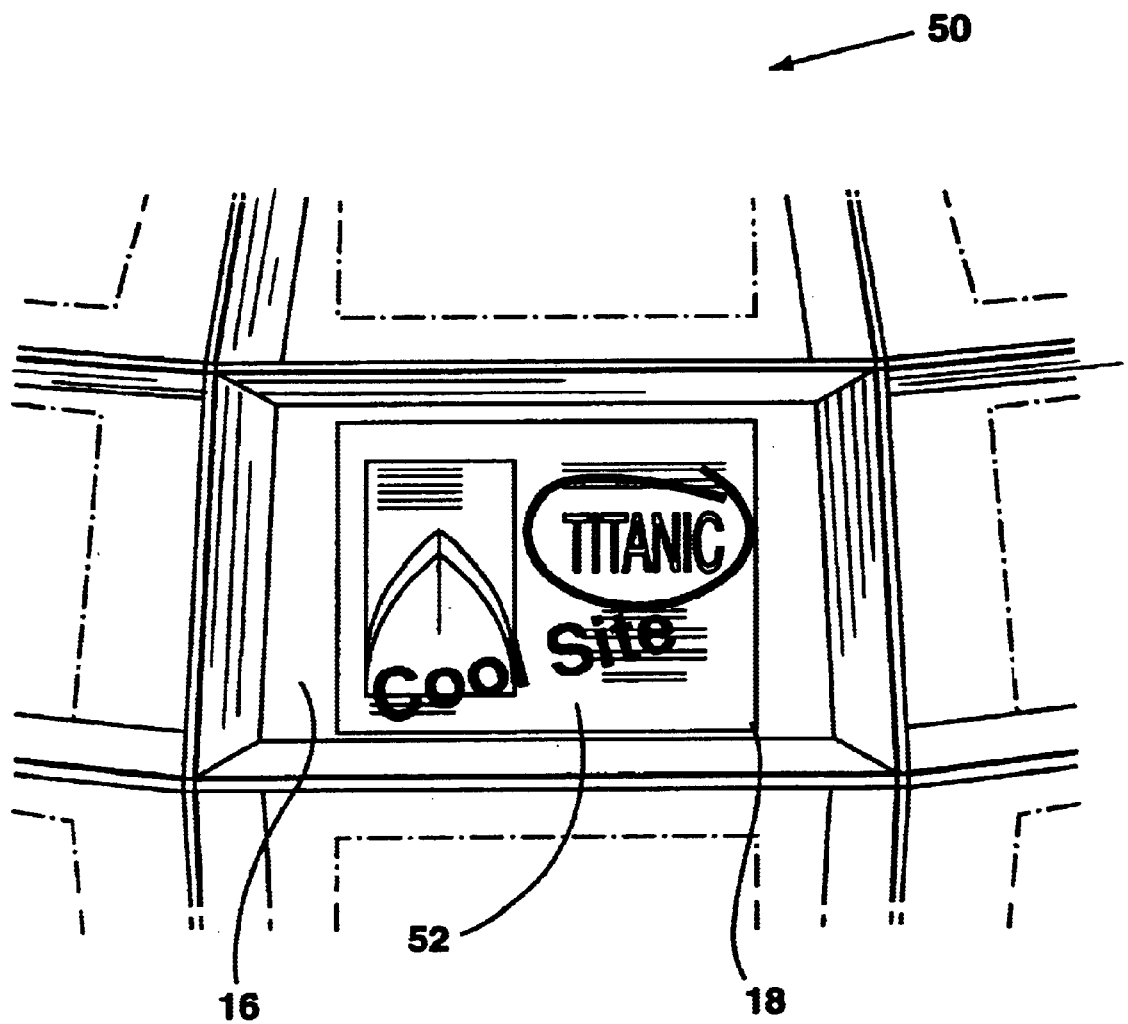
FIG. 4 is an elevational view of a glass pane overlaying a portal.

Referring now to FIG. 4, an elevational view of a glass pane overlaying a sensory cue 18 is shown generally as 50. Glass pane 52 is a transparent surface, which is positioned over sensory cue 18 and within the boundary of a portal 16. Glass pane 52 is an active surface, which allows for various functions such as highlighting, sketching, and copying from other documents. As will be understood by those skilled in the art, the glass pane 52 may be implemented as a transparent texture upon which the user can paint. This function provides recognizable landmarking, which assists in identification of the sensory cue 18. The sensory cue 18 remains unaffected by the contents of the glass pane 52. Glass pane 52 can be cleared, at the user's option.

Figure 5:
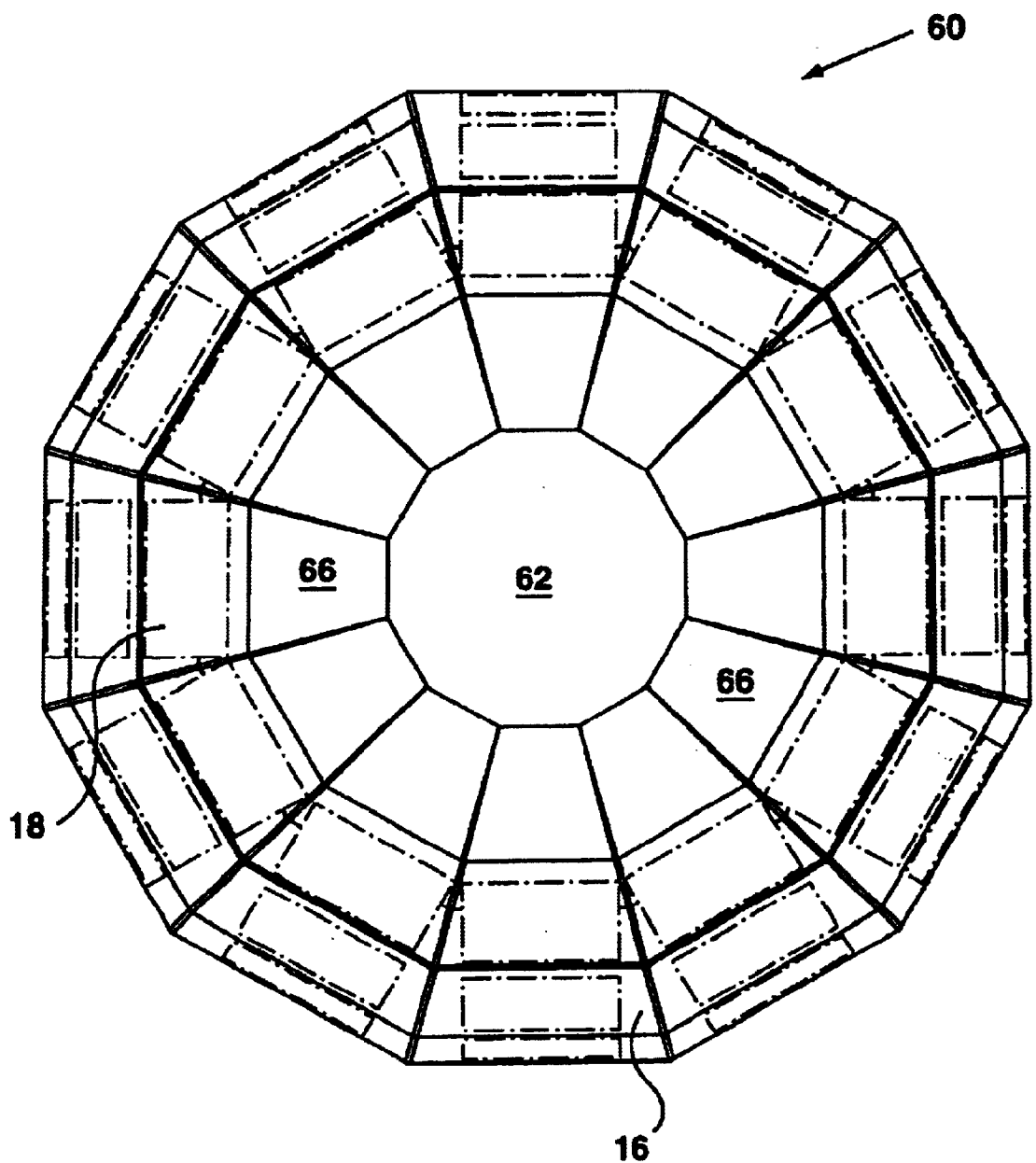
FIG. 5 is a plan view of a polar cap of the present invention.

Referring now to FIG. 5, a plan view of a polar cap of the present invention is shown generally as 60. SUI 10 has two polar caps 62, which can be used for easily identifying a SUI 10 when it is minimized. When a user has multiple SUI's 10 on their desktop, any SUI's 10 not in use are minimized and are displayed as shown in FIG. 5. A user may name or otherwise customize the look of SUI 10 by changing the bitmap image applied to the polar caps 62. Businesses can place their logo or other advertising information on the polar caps 62 of a SUI 10 that they intend to distribute. For example a movie rental outlet may choose to create a SUI 10 for use by their customers in locating movies of interest. This custom SUI 10 may be available in a retail rental outlet or via the Internet or other electronic distribution means. In the case of a custom SUI 10, the creator of the SUI 10 can restrict what content the user may change. For example the images on polar caps 62 may be fixed such that a user may not update them.

Labels 66 reside between portals 16 and polar cap 62. Labels 66 serve to identify each of the vertical groups of portals 16 on the SUI 10. Returning to our movie example, different labels could be used to classify types of movies. For example: horror, science fiction, romance or western. As with portals 16 and polar caps 62, the user may be able to change the content of labels 66 to best aid them in identifying the vertical groups of portals 16. The ability to change the content of a SUI 10 is dependant upon the wishes of the creator of the SUI 10. A supplier of a catalogue embodied in a SUI 10 may choose not to permit modifications to the SUI 10. Conversely, a user wishing to populate a SUI 10 with sensory cues 18 and associated applications will need to change the content of SUI 10.

Figure 6:
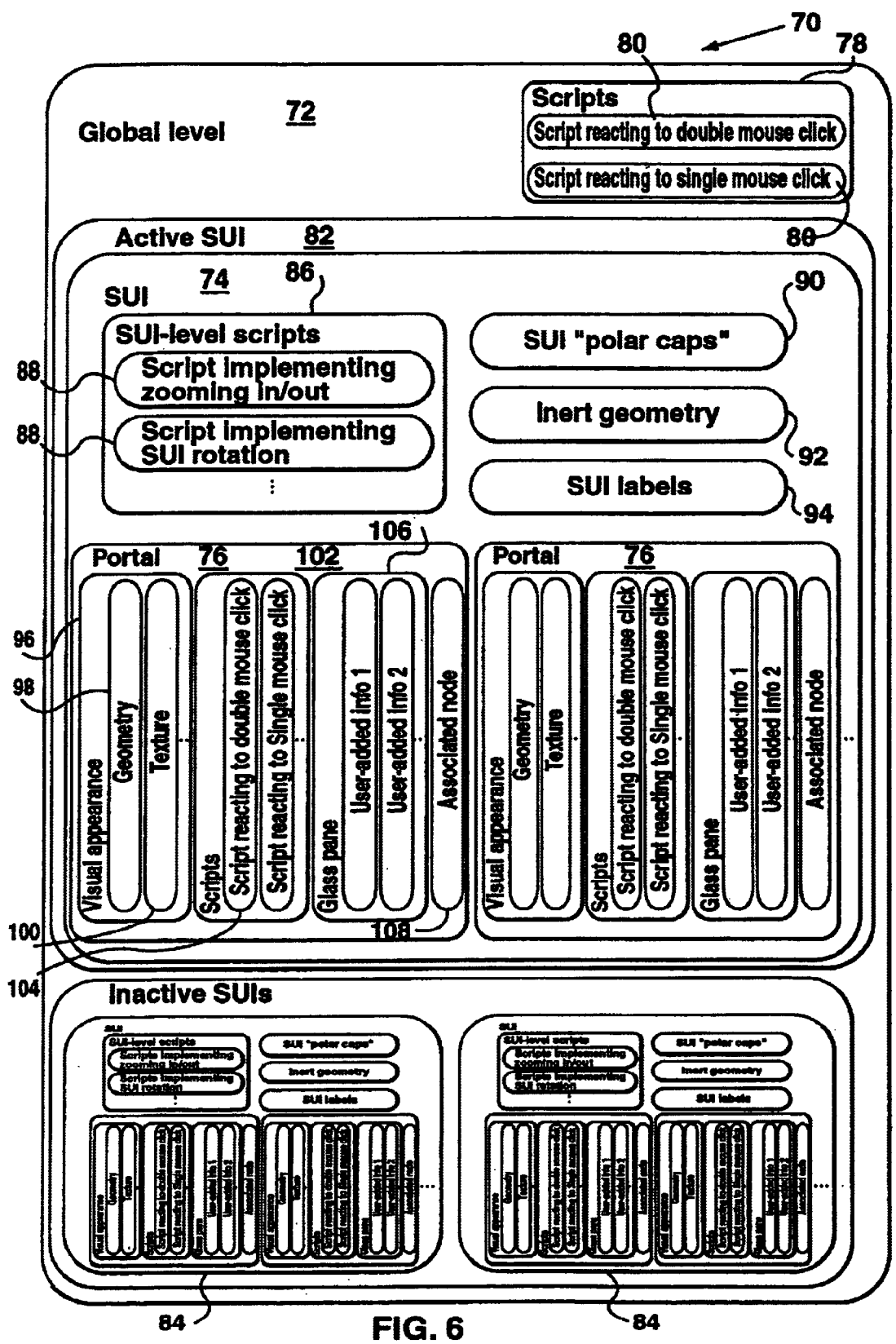
FIG. 6 is a schematic diagram illustrating the logical structure of the present invention.

Referring now to FIG. 6, a schematic diagram illustrating the logical structure of the present invention is shown generally as 70. User interaction with SUI 10 is supported at three levels: a global level 72, a SUI level 74, and a portal level 76. Global level 72 includes the handling of multiple SUIs 12 resident on the user desktop, as well as the ability to create and delete SUIs 10. SUI level 74 includes functionality to manipulate a SUI 10 as a whole, such as navigation between portals 16 by rotating SUI 10. Portal level 76 includes the functionality invoked when an individual portal 16 is activated.

The proposed system supports multiple SUIs 10 accessible at once. For example, a user could have a SUI 10 associated with each project she is working on. At global level 72 the functionality required to deal with one or more SUIs 10 is provided by script library 78. Script library 78 comprises scripts 80, which allow a user to create or delete a SUI 10, define the layout of multiple SUIs 10 and recognize user input to activate and deactivate a SUI 10. User input would typically be provided by a keyboard, mouse or other pointing device, but may also be provided by any other less conventional means such as a touch screen or voice activation. By way of example, there are shown at global level 72 a single active SUI 82 and two inactive SUIs 84.

User interaction at the SUI level 74 can be handled in different ways to best exploit the geometry of a particular SUI 10. In the spherical SUI 10 of the present invention, the user is free to rotate the SUI 10 about any axis by dragging (that is, moving the mouse while keeping the left mouse button depressed). The user can align a portal 16 with the screen (to make it easier to read) with a single-click on the portal 16 (that is, pressing and releasing the left mouse button once). With a single-click selection, the portal is aligned with the centre of the screen and zooms in toward the user. If there is a music script associated with the portal, the music starts playing. The music may then stop playing when the user clicks anywhere outside the portal, or double-clicks on the portal.

The user activates a portal 16 with a double-click (that is, pressing and releasing the left mouse button twice). Activating a portal 16 will bring the SUI 10 closer to the user so that the active portal 16 is large enough for user interaction. In the preferred embodiment, the active portal measures 640×480 pixels, but any practical size for the display device on which the sensory cue 18 within portal 16 is being displayed must be considered.

Now that the portal 16 is active, any application associated with the portal 16 is activated. If the user wishes to resize the window displayed by the portal, the user may do so and the SUI 10 will adjust itself accordingly, i.e. by moving in or out in synchronization with the window size.

Clicking anywhere outside the active portal 16 takes a snapshot of the window of the application in use, which is used to replace the sensory cue 18 on the now inactive portal 16, and zooms out of the SUI 10 to let the user quickly navigate to another portal 16. Dragging the mouse while holding down the control key results in zooming in or out of the current view. The user may also be drawn within the SUI 10 by a script invoked when the user makes a portal 16 active.

Although the above functionality is described in the context of using a two button mouse, one skilled in the art will recognize that it is possible to utilize any input device including but not restricted to mice having single or multiple buttons.

At SUI level 74 functionality is provided by a SUI script library 86 which contains a plurality of scripts 88 which permit the user to interact with the SUI 10. For example one script 88 may implement the zooming in and out of a portal 16 upon activation and deactivation. Another script 88 may handle the rotation of the SUI 10. Also within SUI level 74 are the data structures and functions that implement the display of the SUI 10. SUI polar caps 90 contain the content of polar caps 62. Inert geometry 92 contains the armature 12 of the SUI 10. SUI labels 94 contain the content of labels 66 displayed at each pole of the SUI 10.

At the portal level 76, each portal 16 can have different functionality associated with it. For example, a portal 16 containing a web-browser could be implemented such that every time a Uniform Resource Locator (URL) link is clicked in the browser the SUI 10 is rotated so that an empty portal 16 is activated with an image of the newly selected web page as the sensory cue 18. This could be used to interactively build a SUI 10 showing the browsing history of the user. The functionality associated with each portal 16 is determined at the portal level 76. Thus, the same SUI 10 could have portals 16 that display movie clips when they are activated, others that play sound clips when they are active, and others that start a word processor when they become active. Within portal level 76 is visual appearance data 96 which defines the geometry 98 and texture 100 of the contents of a portal 16. Within portal level 76 is a portal script library 102, which contains a plurality of portal programs or scripts 104 to react to user input at the portal level 76. For example, one script 104 may provide a glass pane 52 on a portal 16. Glass pane dataset 106 contains all the information provided by a user when creating a glass pane 52. If a glass pane dataset 106 exists for a portal 16, the images contained within dataset 106 will be overlaid on a portal 16. Each non empty portal 16 has associated with it a sensory cue 18, and an associated application. Sensory cue 18 is a cue to remind the user of the function of the associated application. Associated node 108 contains information on the content of portal frame 32, which is displayed once a portal 16 has been made active.

Figure 7:
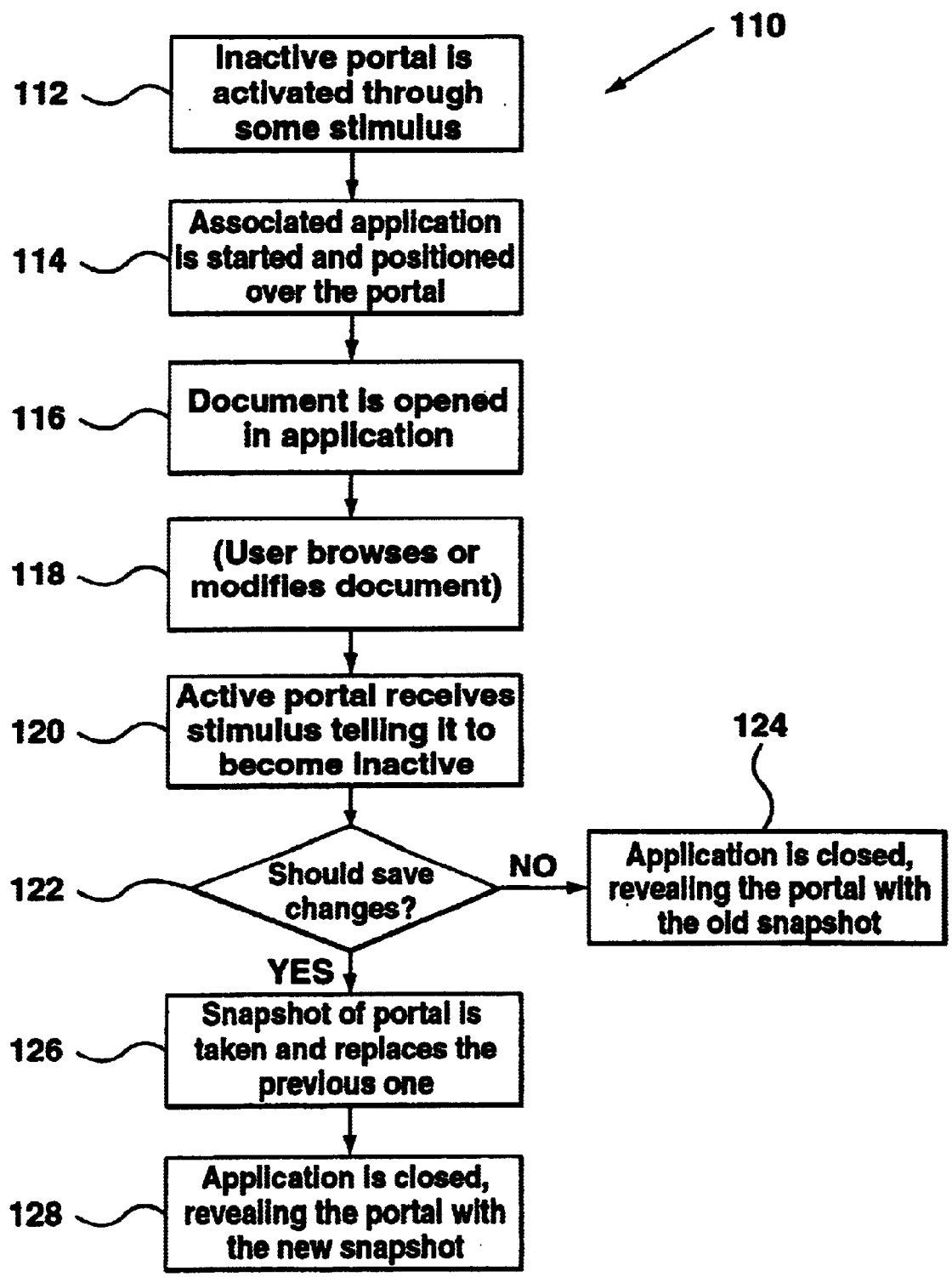
FIG. 7 is a flowchart illustrating user interaction with the SUI of the present invention.

Referring now to FIG. 7, a flowchart illustrating user interaction with the SUI 10 of the present invention is shown generally as 110. Beginning at step 112 the user activates a portal 16 through some stimulus, in the preferred embodiment this is a double click of the left mouse button. At step 114 the associated application corresponding to the portal 16 is started and positioned over the portal 16. At step 116 the sensory cue 18 displayed in the portal 16 is opened by the associated application. At step 118 the user views and possibly modifies the sensory cue. At step 120 the portal 16 is made inactive by some action taken by the user. In the preferred embodiment this action is achieved by single clicking the left mouse button in an area outside of the active portal. Moving now to step 122, the user is given the option to create a snapshot of the current window so that it may become the new sensory cue 18 displayed in portal 16 or to revert to the original sensory cue 18. If the user decides not to save the current window, the process moves to step 124 where the associated application is closed. Should the user wish to have the current window saved as a new sensory cue 18 then a snapshot of the sensory cue is taken at step 126 and saved to be displayed in portal 16. At step 128 the associated application is closed and the new sensory cue 18 is displayed in portal 16.

Figure 8:
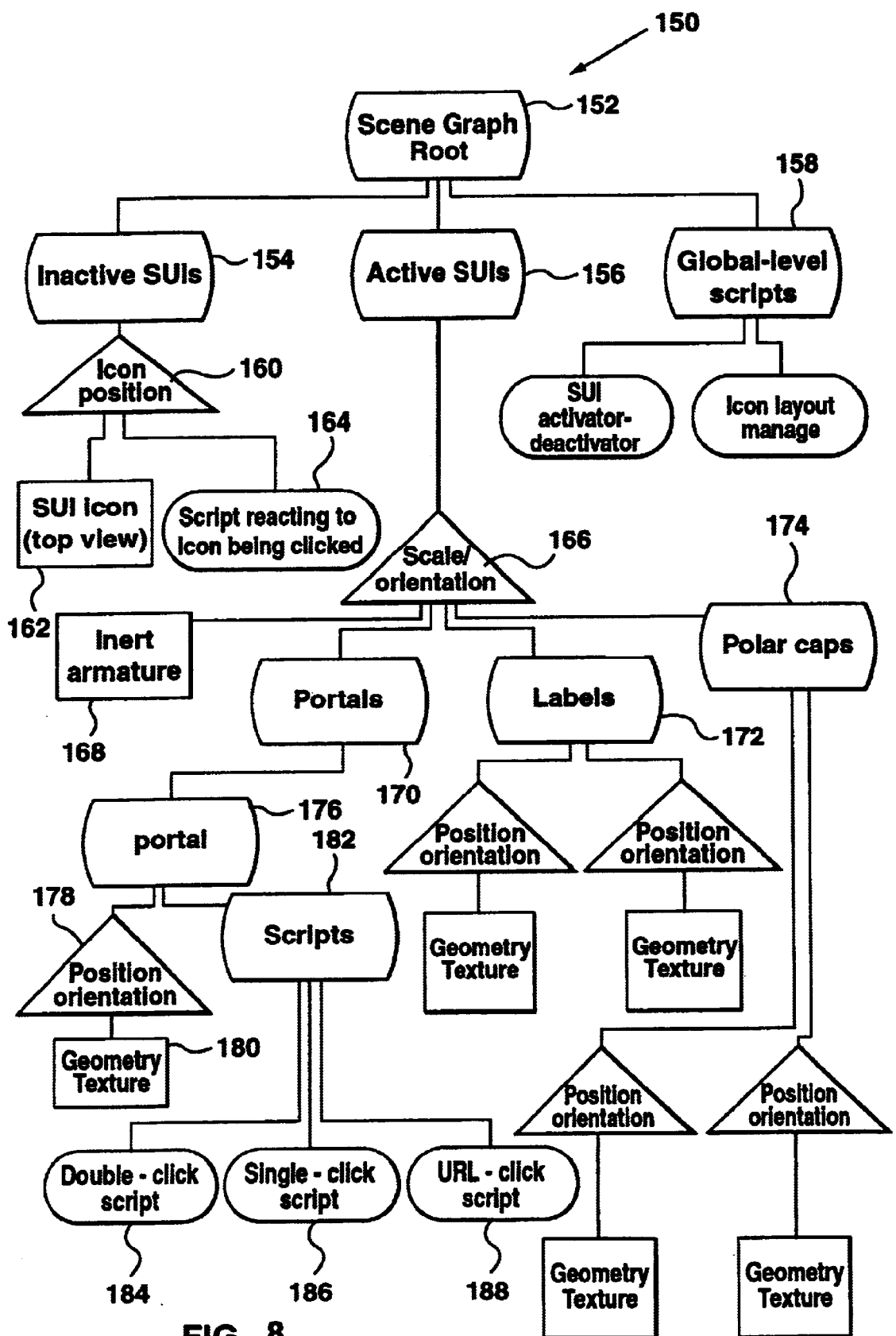
FIG. 8 is a scene graph illustrating the implementation of the preferred embodiment of the present invention.

Referring now to FIG. 8, a scene graph illustrating the implementation of the preferred embodiment of the present invention is shown generally as 150. Most modern high-level 3D graphics libraries support a data structure concept known as a scene graph. A scene graph is a hierarchical method of organizing complex graphic environments in a manner that is both easy to programmatically manipulate and efficient to render. A program known as a renderer traverses the scene graph to render the scene defined within the scene graph. Note that scene graph 150 is a Directed Acyclic Graph (DAG) as it does not contain cycles.

FIG. 8 makes use of four different types of nodes in illustrating scene graph 150. The types of nodes are:

a) a branch group, indicated by a lozenge, b) a transform group, indicated by a triangle, c) a shape node, indicated by a rectangle; and d) a script, indicated by an oval.

A branch group, such as node 152, serves to branch off logical components of the objects that comprise a scene. Node 152 serves as the root of the scene graph 150 and has three logical branch groups, inactive SUIs 154, active SUI 156 and global level scripts 158, each of which have additional sub nodes, which define their attributes.

A transform group such as icon position 160 serves to provide the information required to manipulate and position an object relative to the parent branch group. A shape node such as node 162 contains the data necessary to display an object, such as geometry and texture. In this case node 162 contains data requiring that an inactive SUI 154 be displayed showing one of its polar caps 62.

Finally, a script node such as script node 164 will contain a library of scripts that react to user input. In the case of script node 164 the library will consist of scripts that recognize that an inactive SUI 154 has been selected, reposition it accordingly and make it an active SUI 156.

Active SUI node 156 has a single child, scale/orientation node 166, which is the parent node for all functionality to display, and interact with an active SUI 10. The children of node 166 comprise a shape node for the armature 168, and branch groups 170, 172 and 174 for the portals, labels and polar caps respectively. As the preferred embodiment of the SUI 10 is a spherical shape, there are two polar caps 62 and two sets of corresponding labels 66. This structure is illustrated by the binary sub trees below nodes 172 and 174.

Portals node 170 will have a plurality of portal nodes 176 (although only one is shown), one for each portal 16 in the SUI 10. As one skilled in the art will understand, in the preferred embodiment the, address of the subtree for each portal node is obtained via a hash table utilizing the name of the portal 16 of interest. Although the inventors have chosen a hash table, any other data structure providing rapid access to data for any of the plurality of portals 16 may be utilized as are well known in the art, for example a b-tree. Similarly, each SUI 10 will have a transform group node 166 which is also accessed via a hash table.

As shown, portal node 176 has a transform group subnode 178 to display the contents of the portal, i.e. a sensory cue 18. The information on what to display is contained in shape node 180. Node 176 also has as a sub node a portal scripts branch group 182 which has a plurality of sub nodes 184, 186 and 188 each of which provide specific functionality based upon input provided by the user. Although three scripts are shown, any number of scripts may be provided to act on user input.

Figure 9:
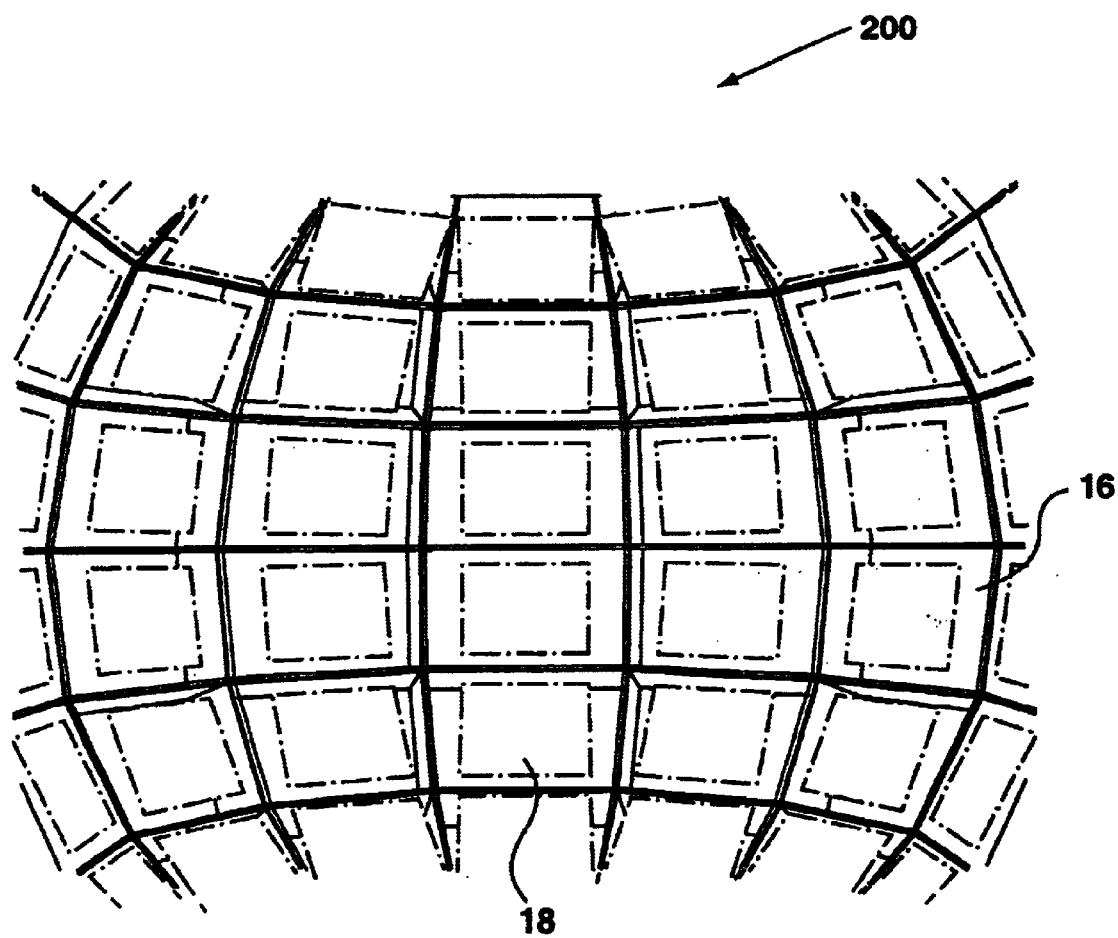
FIG. 9 is an elevational view of an alternative embodiment of the SUI of the present invention.

Referring now to FIG. 9, an elevation view of an alternative embodiment of SUI 10, shows SUI 10 generally as 200. In this embodiment of SUI 10 curves around the user, providing the impression that the user is within a composition of portals 16 which can be rotated around the viewpoint of the user. This embodiment is simply an alternative view where the alternative embodiment 200 appears to wrap around the user. In practice, rendering software displays a front face or a back face of an object based upon the direction of the normal vectors associated with that object. Thus, by reversing the direction of the normal vectors for portals 16 and the associated armature, the back faces of portals 16 are displayed, providing a view that wraps around the user. Sensory cues 18 may be located in the back faces of portals 16 that are different from the sensory cues 18 located on the front faces of portals 16.

Figure 10:
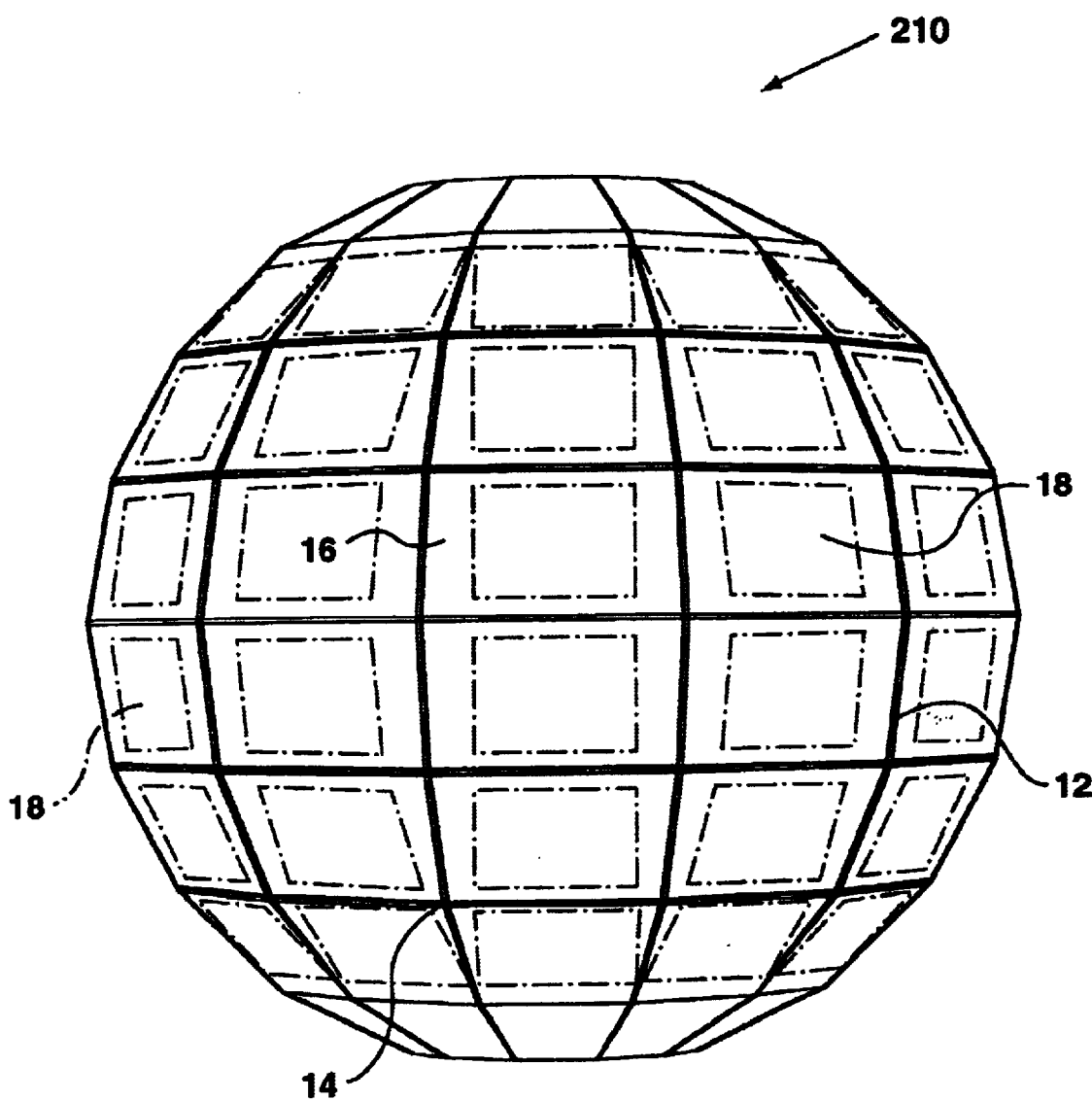
FIG. 10 is an elevational view of an alternative embodiment of the SUI of the present invention.

Referring now to FIG. 10, an elevation view of an alternative embodiment of SUI 10, shown generally as 210. In this embodiment the armature 12 does not have portal frames 32. Thus ribs 14 appear as a wireframe structure with no underlying armature structure.

Figure 11:
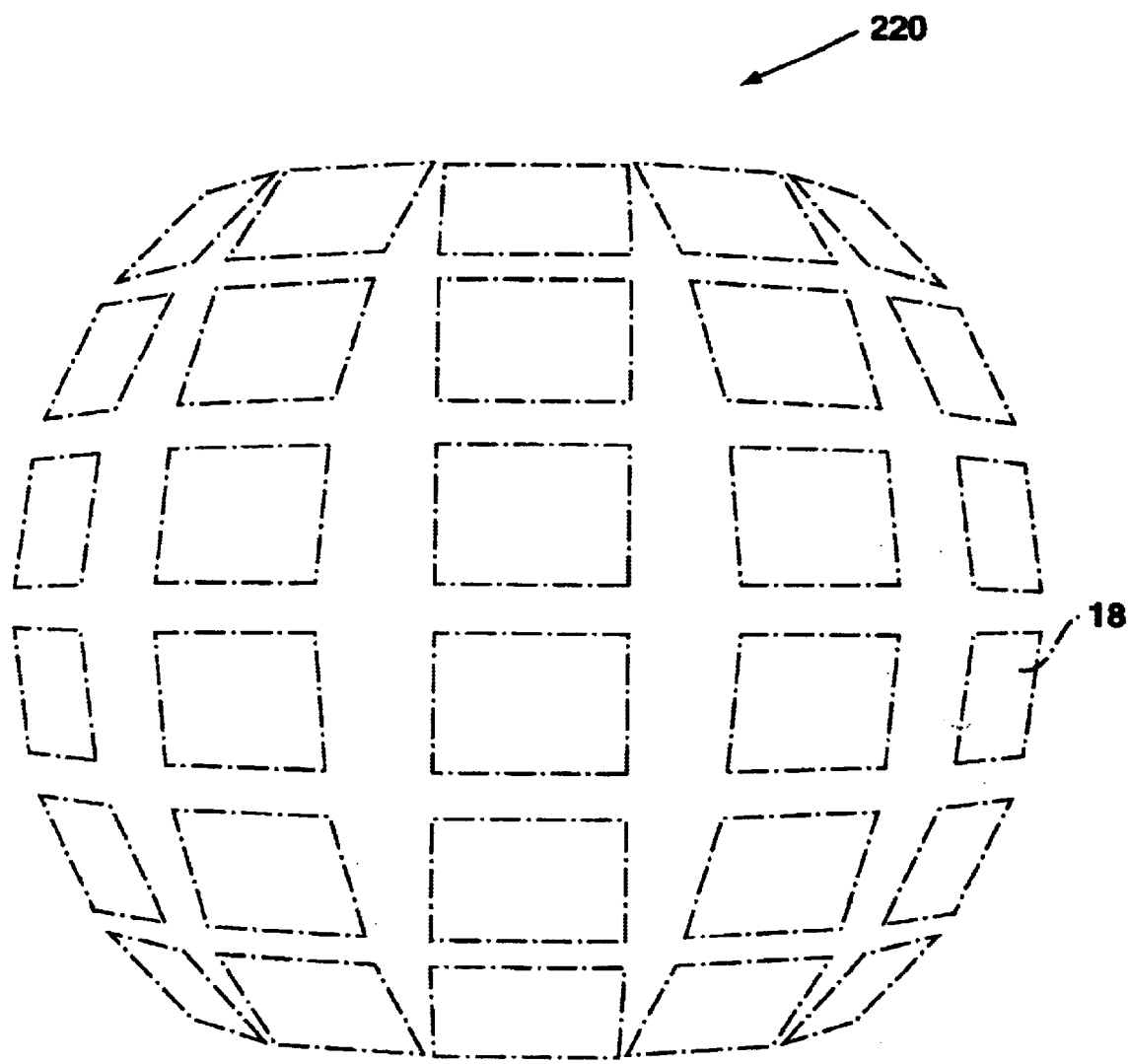
FIG. 11 is an elevational view of an alternative embodiment of the SUI of the present invention.

Referring now to FIG. 11, an elevation view of an alternative embodiment of SUI 10, is shown generally as 220. In this embodiment, no armature 12 is present. Sensory cues 18 themselves define the portals 16. Empty portals 16 may be defined by "empty" sensory cues 18 (e.g. a blank image).

The interior of SUI 10 may also be used to display information, providing a simple two-level hierarchy. This functionality can be useful in many instances, for example with browsing web sites on the Internet. In such a scenario, an exterior portal 16 on SUI 10 could represent the first page of a web site. When the user activates the exterior portal 16, the view is moved to the inside of the SUI 10, and interior portals inside SUI 10 display sensory cues 18 of all the web pages that could be accessed from the web page displayed in the exterior active portal 16. Such an interior view would be similar to the view shown in FIG. 9. The user can activate the portals on the interior of the SUI 10 (which become regular web browsers), or can back out of the SUI 10 to browse the first level of the hierarchy. This is useful for shallow but wide hierarchies as each exterior portal 16 creates a different group of interior portals.

Another way to represent a hierarchy is to place a SUI 10 within a SUI 10. For example, when utilizing a SUI 10 as a web browser, each time a portal 16 is activated, the viewpoint is moved to the inside of the SUI 10 where another SUI 10 displays sensory cues 18 of all the web pages that could be accessed from the active portal. Unlike the previous scenario where the hierarchy can only be two levels deep, this hierarchical scheme is not limited and can continue forever.

A SUI 10 is a self contained object that can be shared with other computer users. Thus a SUI 10 could be used by businesses to distribute information about their services and products. A movie theatre company, for example, could make available on its web site a MovieWorld, i.e. a SUI 10 that shows all available movies playing in a particular city. Screen captures of the movies would be displayed as sensory cues 18 on SUI 10. When the user selects a movie, the viewpoint moves to the inside of the SUI 10, where the portals 16 contain sensory cues 18 of the locations where a particular movie is playing.

Although third parties may provide populated SUIs 10, users may create their own SUIs 10. In this situation, the user is provided with an empty SUI 10 (e.g. just the armature 12). The user may then populate the portals 16 with applications (and sensory cues 18) that are of interest to the user. As with any software program dealing with the editing of content, the user is free to let an application populate the SUI 10 or select individual sensory cues 18 as they wish. In one such scenario, a user may have access to a device that stores and plays music. A custom SUI 10 may be constructed by the user to index all of the music available on the device. In this case the sensory cues 18 could be an illustration of the musicians (i.e. the cover label of a disc or a promotional poster) or could perhaps include lyrics or musical notes or even an audio sample of the music. Upon selecting a sensory cue 18 (in this case a compilation or perhaps a single track), the associated software application would be invoked to locate and play the music identified by the sensory cue 18.

Functionality may be added to the present invention by users and programmers alike through scripting. A script is a program that can be associated with one or more portals and is activated through user interaction or other stimuli. Referring back to the MovieWorld example, functionality could be added to a portal to enable a sound clip or a movie trailer to be played when the portal is activated.

Script authoring is provided through a visual interface for simple scripts or through a text-based interface for more sophisticated users. The visual interface will be available to a user who wishes to customize a SUI 10. More sophisticated users may take advantage of third party script libraries. Scripting is supported at the global level 72, at the SUI level 74 and at the portal level 76.

In addition to the static model of creating a sensory cue 18 for a portal 16, sensory cues 18 may be automatically updated by their associated application. The associated application may continue to execute even if the portal 16 in which it is contained is not active. For example, a user may choose to render a complex 3D figure and rather than wait for the application to complete the rendition, move on to another portal. Upon completion of the rendition, the portal will be updated with the new 3D figure.

By way of further example, sensory cues 18 may be updated in real-time through a network connection. Information in a portal may be updated by either pushing or pulling information. A SUI 10 can employ both strategies simultaneously for different portals. Regardless of how the information is updated for each portal 16, SUI 10 supports dynamic rearrangement of the portals 16 and/or the attributes of a portal frame 32. A user may move the information associated with a portal 16 to another portal 16. In the preferred embodiment this is implemented through a right mouse button click on the active portal which displays a drop-down menu providing the user with portal relocation, deletion or update options.

With regard to the pulling of information, a script associated with one or more portals 16 could periodically open a network connection, via TCP/IP socket or any other convenient means, to connect to an information server to obtain new information. The server does not need to know that a script is querying it. For example, a script could download a web page containing stock quotes from a public quote server, such as finance.yahoo.com. This approach requires that the script understand how to parse the information received from the server rather than the two parties agreeing to a (presumably simpler) common communication protocol. This approach is best suited for slowly updating information, as there is no established protocol for obtaining only the exact information required, significant amounts of non relevant data may be acquired Furthermore, SUI 10 may not know when the information on the information server was last updated. Querying the information server too often will result in wasted network resources. Querying not often enough will result in outdated information being displayed by the SUI 10.

With regard to the pushing of information, a portal 16 establishes an initial connection with a SUI-aware server. The script establishing the connection will attempt to reestablish the connection in the case of a communications error. Whenever new information is available, the server automatically "pushes" it to the SUI 10. This requires a common protocol to be followed by both the server and the SUI 10. This approach is best suited for large information sources where only part of the information is updated in a frequent yet non-periodic manner. A stock portfolio is a good example. In this case, there can be a long list of stocks being monitored, yet some stocks trade with high demand and some with low demand. With the server pushing the information to the information sink (the SUI 10), only the information that has changed is transmitted. If the SUI 10 had to query the information server, a lot of (potentially non-updated) information could be downloaded each time.

Any number of schemes may be developed to make a web site "SUI-aware". One such scheme would be for the web site to be aware of which portal 16 a web page or other web site content (e.g. streaming video or audio) should be pushed to. As will be recognized by those skilled in the art, this may be accomplished through the use of an agreed upon Hypertext Markup Language (HTML) tag within the web site. Variations on this scheme may include an HTML tag which points to content to be delivered to a portal 16 as chosen by the SUI 10. Such schemes put the onus upon the web site or content provider to provide a sensory cue 18 to populate a portal 16. These schemes may also be implemented by Internet search engines. Should a user wish to populate a SUI 10 with web sites of interest on a specific topic, the search engine would be aware of the HTML tags and rather than return a list of URL's, return content to populate portals 16.

As can be appreciated by those skilled in the art, the invention as described herein may be applied to any computing device capable of implementing the present invention. It is not the intent of the inventors to restrict the invention to conventional computing devices. For example the present invention would provide an excellent interface to devices such as a cellular telephone having restricted screen size or an Internet enabled television. Applications of the present invention are numerous and include a new user interface to any operating system and any computer application (including world-wide-web browsers, word processors, spreadsheets, etc.).

As will be apparent to those skilled in the art, various modifications and adaptations of the method and system described above are possible without departing from the present invention, the scope of which is defined in the appended claims.

What is claimed is:

1. A user interface for a computing device, said interface comprising:
    a) a plurality of portals containing content, wherein said plurality of portals are arranged in a three dimensional graphical representation for display to a user, and wherein for each of said plurality of portals, an application that permits user interaction with the content contained therein is associated therewith; and
    b) a plurality of sensory cues, wherein for each of said plurality of portals, a sensory cue is displayed therein that provides a cue to the content contained therein:
        wherein said user interface is adapted to changes, based on the content contained in one or more portals of the user interface, to one or more geometric properties thereof dynamically, so that the graphical representation displayed to said user is changed, and said changes comprise at least one of the following group of changes:
            (i) change to the shape of the user interface,
            (ii) change to the shape of one or more portals of the user interface, and
            (iii) change to the arrangement of portals of the user interface.

2. The interface of claim 1 further comprising user input means permitting said user to rotate said interface about a plurality of axes.

3. The interface of claim 1 further comprising user input means permitting said user to adjust the geometry of said interface.

4. The interface of claim 1 further comprising user input means, permitting said user to view the details of a portal of interest, said portal of interest increasing in size for enhanced viewing by said user.

5. The interface of claim 1 further comprising user input means permitting said user to select a portal to be made active, said selection resulting in the execution of the application associated with said portal.

6. The interface of claim 1 wherein said graphical representation is in the form of a sphere, with the exterior of the sphere displayed to said user.

7. The interface of claim 1 wherein said graphical representation is in the form of a sphere, with the interior of the sphere displayed to said user.

8. The interface of claim 1 wherein at least one of said portals contains a user interface.

9. The interface of claim 1, further comprising user input means, said user input means accepting input to permit said user to access an interior of said graphical representation.

10. The interface of claim 1 wherein said graphical representation includes an armature to visually define each of said portals.

11. The interface of claim 1 further comprising user input means for accepting input from said user to create a transparent pane for covering a portal, said transparent pane containing content editable by said user.

12. The interface of claim 6, wherein said sphere includes polar caps and labels.

13. The interface of claim 7, wherein said sphere includes polar caps and labels.

14. A method for creating a populated three dimensional user interface, said method comprising the steps of:
   a) arranging a plurality of portals containing content in a three dimensional graphical representation for display to a user;
   b) for each of said plurality of portals, associating an application therewith that permits user interaction with the content contained therein;
   c) for each of said plurality of portals, displaying a sensory cue therein that facilitates recognition by a user of the application associated therewith; and
   d) dynamically changing one or more geometric properties of said user interface based on the content contained in one or more portals of the user interface, so that the graphical representation displayed to said user is changed, and at least one of the following group of changes is made: change to the shape of the user interface, change to the shape of one or more portals of the user interface, and change to the arrangement of portals of the user interface.

15. A computer device for displaying a three dimensional user interface, said device comprising means for displaying said interface, said interface comprising: a plurality of portals containing content, wherein said plurality of portals are arranged in a three dimensional graphical representation for display to a user, and wherein for each of said plurality of portals, an application that permits user interaction with the content contained therein is associated therewith; and a plurality of sensory cues, wherein for each of said plurality of portals, a sensory cue is displayed therein that provides a cue to the content contained therein; and wherein said user interface is adapted to changes, based on the content contained in one or more portals of the user interface, to one or more geometric properties thereof dynamically, so that the graphical representation displayed to said user is changed, and said changes comprise at least one of the following group of changes:
   (i) change to the shape of the user interface,
   (ii) chance to the shape of one or more portals of the user interface, and
   (iii) chance to the arrangement of portals of the user interface.

16. The device of claim 15 wherein at least one application is a further three dimensional interface.

17. The device of claim 15 wherein said graphical representation is hollow and at least one of said portals provides access to the interior of the space within said graphical representation, said interior containing a plurality of interior portals.

18. The device of claim 17 wherein the interior of said interface contains a further interface.

19. The device of claim 18 wherein said further interface contains a plurality of additional interfaces to a depth selected by a creator of said three dimensional user interface.

20. The device of claim 15 wherein said graphical representation is spherical in shape.

21. The device of claim 20 wherein said graphical representation further comprises polar caps and labels.

22. A method for populating portals in a three dimensional user interface, said user interface comprising an arrangement of a plurality of portals and having an exterior and an interior, comprising the steps of:
   a) establishing a connection with a first web page;
   b) creating a sensory cue based on the first web page;
   c) mapping said sensory cue to one of said plurality of portals located on the exterior of said user interface;
   d) creating sensory cues for each additional web page accessible from said first web page and mapping said sensory cues to at least one portal of said plurality of portals located on the interior of said user interface; and
   e) dynamically changing one or more geometric properties of said user interface based on the content contained in one or more portals of the user interface, so that the graphical representation displayed to said user is changed, and at least one of the following group of changes is made; change to the shape of the user interface change to the shape of one or more portals of the user interface, and change to the arrangement of portals of the user interface.

23. A computer readable medium containing instructions for controlling one or more three dimensional user interfaces in a computing device, by:
   a) permitting a user to select a user interface, said selected interface containing a plurality of portals, wherein said plurality of portals are arranged in a three dimensional graphical representation for display to said user, and wherein said selected interface is adapted to permit changes to one or more geometric properties of said selected interface dynamically based on the content contained in one or more portals of the user interface, so that the graphical representation displayed to said user is changed, and at least one of the following group of changes is made; chance to the shape of the user interface, change to the shape of one or more portals of the user interface, and change to the arrangement of portals of the user interface:
   b) monitoring for first user input, said input indicating a portal of interest to said user;
   c) upon receiving said first user input, moving said selected interface to centrally display said portal of interest;
   d) monitoring for second user input to make said portal of interest an active portal, if input other than said second user input is received, returning to step b);
   e) upon receiving said second user input, invoking an application program, until said user provides third user input to move another portal; and
   f) repeating steps b) to e) until said user provides third user input, thereby returning to step a).

* * * * *

UNITED STATES PATENT AND TRADEMARK OFFICE
CERTIFICATE OF CORRECTION

PATENT NO. : 6,636,246 B1
DATED : October 21, 2003
INVENTOR(S) : Anthony Carmen Gallo et al.

It is certified that error appears in the above-identified patent and that said Letters Patent is hereby corrected as shown below:

Column 6,
Line 14, replace "3D. SUI" with -- 3D SUI --
Line 18, replace "Ribs. 14" with -- Ribs 14 --

Column 11,
Line 15, replace "embodiment the, address" with -- embodiment the address --

Column 14,
Line 28, replace "therein:" with -- therein; --
Line 29, replace "changes" with -- change --
Line 31, replace "user interface, to one or more geometric properties" with -- user interface, one or more geometric properties --
Line 35, replace "changes:" with -- changes; --

Column 15,
Line 26, replace "made:" with -- made; --
Line 41, repalce "changes" with -- change --
Line 46, replace "changes:" with -- changes; --
Lines 48 and 50, replace "chance" with -- change --

Column 16,
Line 26, replace "interface change" with -- interface, change --
Line 42, replace "chance" with -- change --
Line 45, replace "interface:" with -- interface; --

Signed and Sealed this

Tenth Day of August, 2004

JON W. DUDAS
*Acting Director of the United States Patent and Trademark Office*